United States Patent
Bursal et al.

[11] Patent Number: 6,125,711
[45] Date of Patent: Oct. 3, 2000

[54] MULTI-STAGE SPEED CONVERTER WITH IDLER

[75] Inventors: Faruk H. Bursal, Waltham, Mass.; Michael P. Cunningham, Londonderry, N.H.

[73] Assignee: Synkinetics, Inc., Lowell, Mass.

[21] Appl. No.: 09/017,972

[22] Filed: Feb. 3, 1998

[51] Int. Cl.[7] .............................. F16H 13/04; F16H 13/08
[52] U.S. Cl. .................................. 74/63; 475/196; 476/36
[58] Field of Search ................................. 74/63; 475/196; 476/36

[56] References Cited

U.S. PATENT DOCUMENTS

| | | | |
|---|---|---|---|
| 3,468,175 | 9/1969 | Rabek | 74/63 |
| 4,476,735 | 10/1984 | Cantwell | 74/84 R |
| 5,312,306 | 5/1994 | Folino | 475/196 |
| 5,321,988 | 6/1994 | Folino | 74/25 |
| 5,514,045 | 5/1996 | Folino | 476/36 |
| 5,562,564 | 10/1996 | Folino | 476/36 |
| 5,600,999 | 2/1997 | Folino | 74/122 |
| 5,607,370 | 3/1997 | Maslow et al. | 475/196 |
| 5,683,323 | 11/1997 | Imase | 475/168 |
| 5,722,910 | 3/1998 | Folino | 476/36 |

FOREIGN PATENT DOCUMENTS

| | | |
|---|---|---|
| 2346611 | 10/1977 | France ..................................... 74/650 |
| 59-133863 | 8/1984 | Japan . |
| 60-168954 | 9/1985 | Japan . |
| 1257-331 | 2/1985 | U.S.S.R. . |
| 1399-548 | 12/1986 | U.S.S.R. . |
| 1490-362 | 5/1987 | U.S.S.R. . |
| 1821597-A1 | 10/1990 | U.S.S.R. . |
| PCT/US92/02023 | 10/1992 | WIPO . |
| WO 92/16775 | 10/1992 | WIPO . |
| PCT/US94/00841 | 8/1994 | WIPO . |
| WO 94/18472 | 8/1994 | WIPO . |
| PCT/US94/06634 | 12/1994 | WIPO . |
| WO 94/29617 | 12/1994 | WIPO . |

OTHER PUBLICATIONS

"Balls Reduce Speed and Transmit Torque", *Mechanical Engineering & Technology Guide*,; publ. prior to Mar. 14, 1991.

Dojen™ Precision otary Actuator Designer's Guide (Dir. of Lenze, Woburn, MA), published prior to Mar. 14, 1991.

"General Information on Sinusoidal Ball Drives", *Soviet Engineering Research*, vol. 6 (1986) Feb., No. 2 @ pp. 23–26, Mowbray, Leicestershire B. (also referenced as *Sov. Engineering Research*, V. Mashinostroeniya, Jun. 1986, Issue 2, pp. 24–28).

*Primary Examiner*—Allan D. Herrmann

[57] ABSTRACT

Method and apparatus for achieving high torque and speed reduction in a compact and light-weight low parts-count speed converter apparatus featuring a floating ground element that both provides a moving ground to the first stage and acts as an input to a second stage, wherein both stages cooperatively drive the output.

16 Claims, 10 Drawing Sheets

MULTI-STAGE SPEED CONVERTER WITH IDLER

BACKGROUND OF THE INVENTION

The present invention relates to mechanical power transmissions, and more particularly, to mechanical conversion of rotary motion.

In the field of power transmission it is often useful to combine a primary power source, such as an electric motor, with a speed converter unit, to deliver the required torque at the desired speed. It is particularly useful to incorporate at least one stage of speed reduction within the housing of the drive source. These are typically referred to as gear motors or reducer motors. Various configurations of gears are used, including assemblies of planetary gears, helical gears, etc.

One advantage of having a drive source with integrated speed conversion is that an entire motor/converter assembly can be optimized for its intended use. Still any design is favored that can result in lower parts count in a compact and lighter-weight package.

It is therefore an object of the present invention to provide an ultra-compact and light-weight multi-stage speed converter.

It is another object of the present invention to provide an ultra-compact and light-weight speed converter with an integral motorized source and having the benefit of multiple stages of speed conversion.

It is yet an additional object of the present invention to provide optimized load sharing among the elements that transmit the rotary motive force in a motorized speed converter.

It is another object of the present invention to provide an improved rotary actuator which is simplified in nature but is robust in transmission capability.

It is yet another object of the present invention to provide a precision rotary actuator having a multiple-stage speed converter which requires few moving parts and yet is easy to use and has high positioning accuracy.

It is a further object of the present invention to provide a precision rotary actuator having an auto braking feature.

It is a further object of the present invention to provide a precision rotary actuator in two stages with reduced parts and in a small package.

SUMMARY OF THE INVENTION

These and other objects are well met by the presently disclosed compact multi-stage speed converter of the invention. The invention features method and apparatus for achieving good torque throughput and high speed reduction in a compact and light-weight low parts-count speed converter apparatus featuring a floating or moving ground element (also referred to as an "idler") that both provides a moving ground to the first stage and acts as an input to the second stage, wherein both stages cooperatively drive the output. A preferred embodiment of the present invention utilizes a pair of cam tracks which interact with each other through transmitting means, such as balls or rollers. These balls react the rotary motive force input while they oscillate in slots of a slotted disk. In one embodiment, the cam tracks are cut into the face of flat cam disks.

In a particular embodiment, the cams together comprise a conjugate pair of devices rotatable about a common axis, a first device of the pair being an input device for supply of drive rotation. A flat slotted disk device with radially extending slots is used with the cam disks. One of the devices serves as an output device. The slotted disk receives the balls as interacting elements that are put in motion by the input device. The input device cooperates with the in-motion interacting elements and the output device for transmitting, through all the in-motion interacting elements, the angular velocity and rotary motive force of the input device to angular velocity and rotary motive force of the output device. This transmission is preferably through all the in-motion interacting elements, substantially equally and simultaneously.

Preferably all of the moving transmission elements share the load equally, continuously and simultaneously, thereby decreasing the unit load on each transmission element. Preferably means are provided for preloading balls and drive and driven parts. In one embodiment, there is zero backlash since all of the transmission elements are in contact and under preload. In an embodiment, the assembly has a self-braking feature.

This invention has a multiplicity of applications, in processing equipment, in flow control, and in equipment positioning, local and remote, manual and automated. Various modifications of the specific embodiments set forth above are within the spirit and scope of the invention.

Ideally, all cams of the invention are configured in conjugate pairs. The slot is longer than the anticipated ball travel and therefor does not effect change of ball travel direction. The cams are also configured such that at this change of direction, each ball is essentially unloaded, thus reducing frictional losses. The number of balls is determined as the difference or sum of the cam cycles of both cams, expressed as the number of slots on the slotted disk. The number of cycles on the drive and driven cams are selected according to the desired speed conversion ratio, determined in the manner set forth below.

In practice of the present invention, a preferred motorized two-stage speed converter apparatus is driven by an integral frameless motor. The speed converter translates the rotary force of the motor to a desired rotary force at the speed converter output according to the speed conversion ratio of the two-stage speed converter assembly. The entire apparatus has an open center for passage of cables and the like up within its middle. Every component is preferably provided with lightening features.

In the two-stage prior art of U.S. Pat. Nos. 5,312,306 and 5,562,564 two independent stages are used, each designed individually and each with its own set of three components serving as input, output and ground, except that the output of the first stage constitutes the input of the second stage. The total number of components in such a two-stage arrangement is five. The present invention yet reduces parts count further in a very compact and light-weight robust mechanism by defining a spatial arrangement of the components that permits the use of a single member as the effective ground for both stages thereby reducing the number of components to from the conventional two-stage prior art five to a novel four parts.

The present invention includes a floating intermediate member which serves this function, where its slotted part provides a moving ground to the first stage while it also acts as one of two outputs of the first stage and while its two-tooth track also acts as the input to the second stage. The first and second stages both drive the output in the same direction and at the same time. Thus the torques from each stage are combined.

A major challenge in the presently disclosed novel designs is the avoidance of a differential-type power flow graph for the combined two-stage drive. Differential designs can yield very high speed ratios, but at very low efficiencies due to the existence of a closed loop in the power flow graph. Power flows indicate which elements in a drive are doing work on which other elements. Typically power flows in a single direction through the system from the input towards the output, with a fraction being lost to inefficiency at each step. In some adverse cases such as differentials, however, there is a power loop where two elements are simultaneously doing work on one another. These loops are very inefficient and waste a lot of power. They should, therefore, be avoided. The preferred configurations described herein are non-differential drives with "moving ground", where the output receives positive power from both Stages. This results in especially advantageous drives because some of the power in Stage I flows directly to the output, bypassing whatever inefficiency may exist in Stage II. Alternative configurations using differential drives are possible but at a loss of torque throughput.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF PREFERRED EMBODIMENTS

Figure 1:
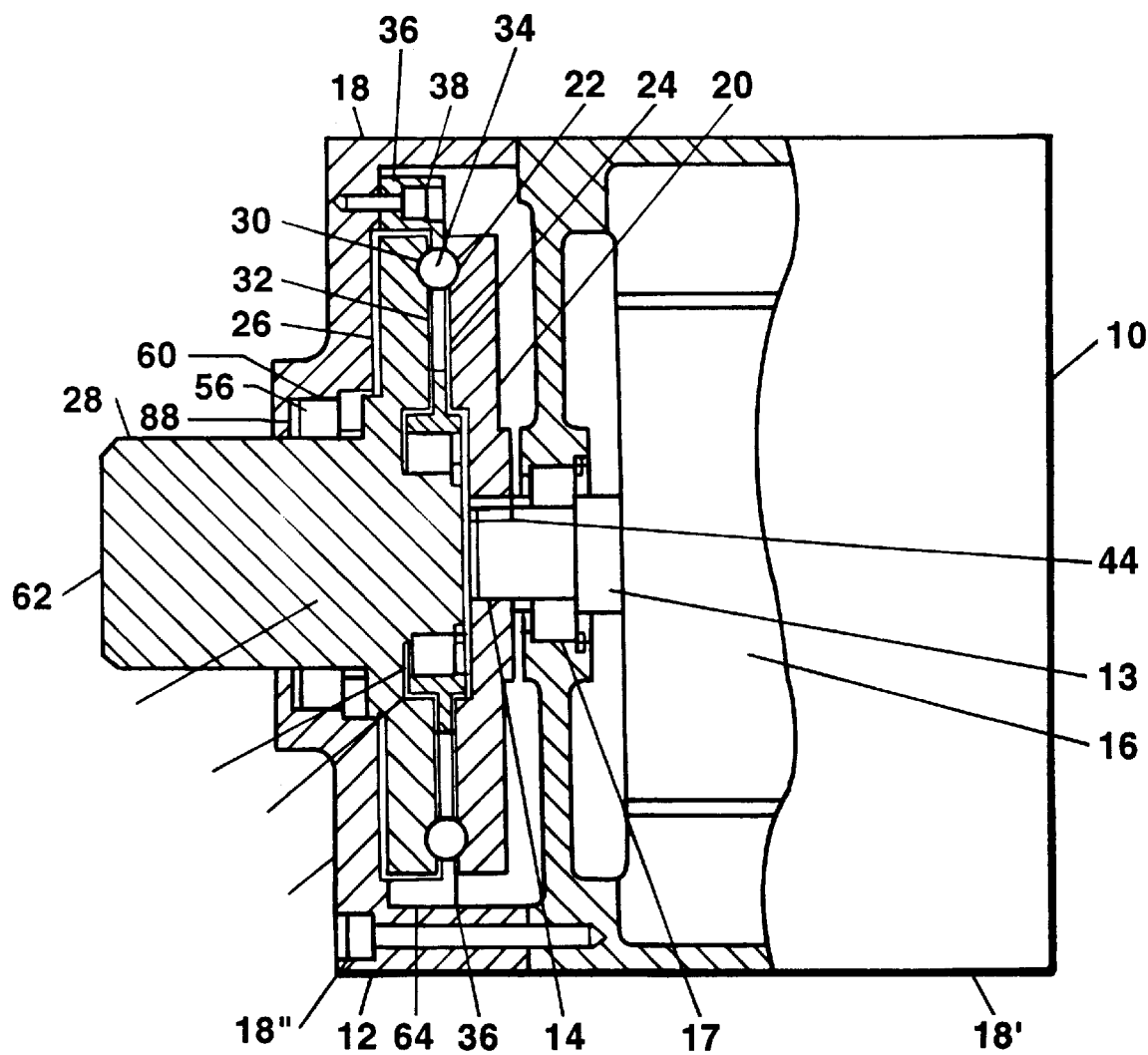
FIG. 1 is a partly broken-away side cross-sectional view of a motor having an integrated speed converter in the prior art.

Prior art ball type speed converters are shown in U.S. Pat. Nos. 5,312,306 and 5,562,564, both incorporated herein by reference. One such prior art motorized ball-type speed converter 10 is shown in FIG. 1, in which a speed converter assembly 12 is coupled to the shaft 14 of a motor 16. The speed converter assembly is mounted in assembly housing 18 which mounts to motor housing 18' via bolts 18". The speed converter translates the angular velocity and rotary motive force of the motor output to a desired angular velocity and rotary motive force output.

The basic speed converter assembly 12 of the invention includes a circular-disk with a drive cam 20, mounted concentrically to motor shaft 14 supported by motor bearing 17. A drive cam track 22 is defined on the drive face 24 of cam 20. A circular-disk driven cam 26 is also provided, mounted concentrically to the axis of shaft 14, and from which the output is taken at output shaft 28, also mounted concentrically to the axis of shaft 14. Shaft 28 is fixed to or integral with the driven cam disk 26.

A driven cam track 30 is defined on the driven face 32 of driven cam 26. The drive and driven cams interact via rolling elements 34, e.g., balls. The balls are retained by a reaction disk 36 which is grounded to housing 18.

Figure 2:
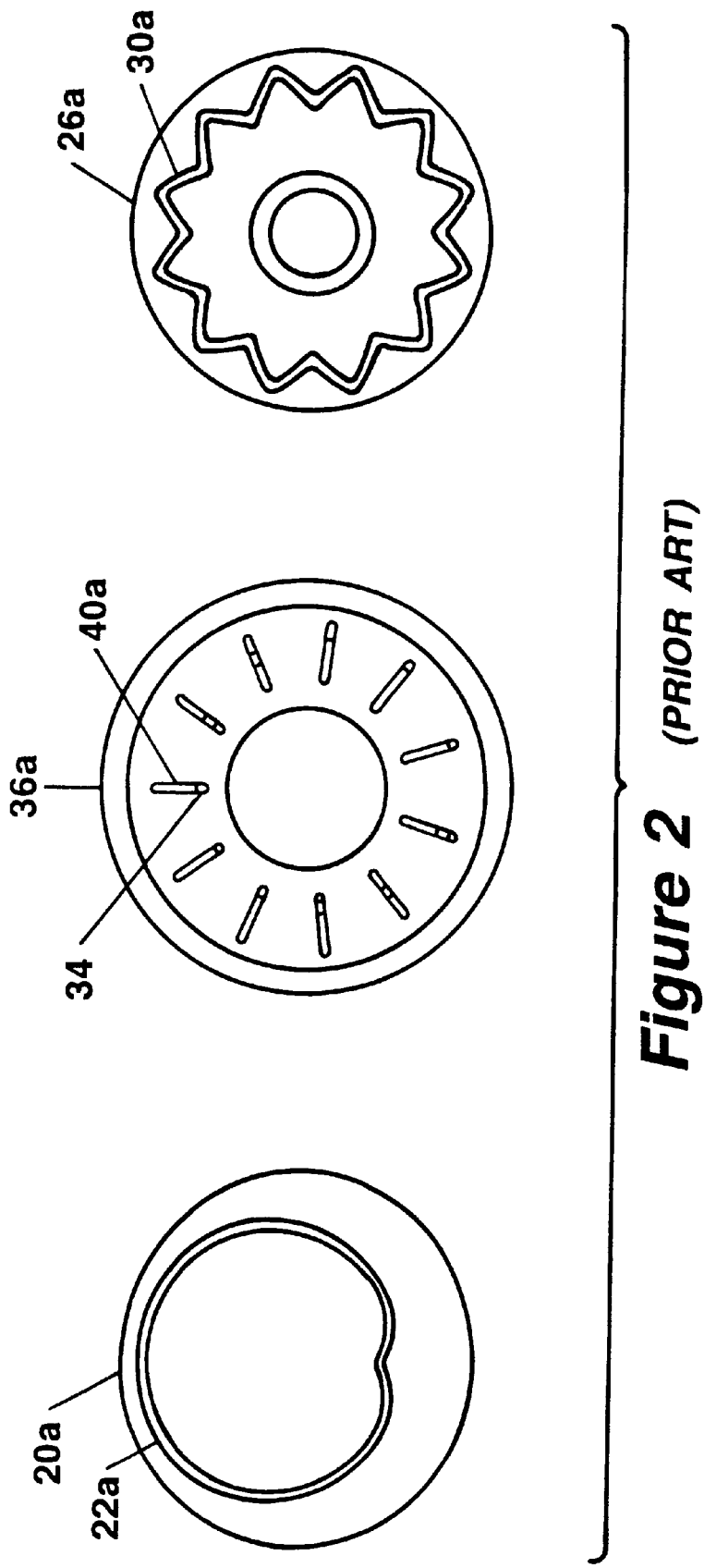
FIG. 2 is an illustration of the basic speed conversion elements of the prior art device of FIG. 1.

FIG. 2 shows the basic elements of the invention. A 12:1 speed reducer configuration is shown in FIG. 2 in which a drive cam disk 20a is provided with a single cycle cam track 22a. The balls 34 oscillate in slots 40a of the slotted reaction disk 36a as they are driven by the rotating drive cam track 22a, and these oscillating balls, by their cooperation with the flanks of the twelve cycle driven cam track 30a rotate the driven cam disk 26a.

Figure 3:
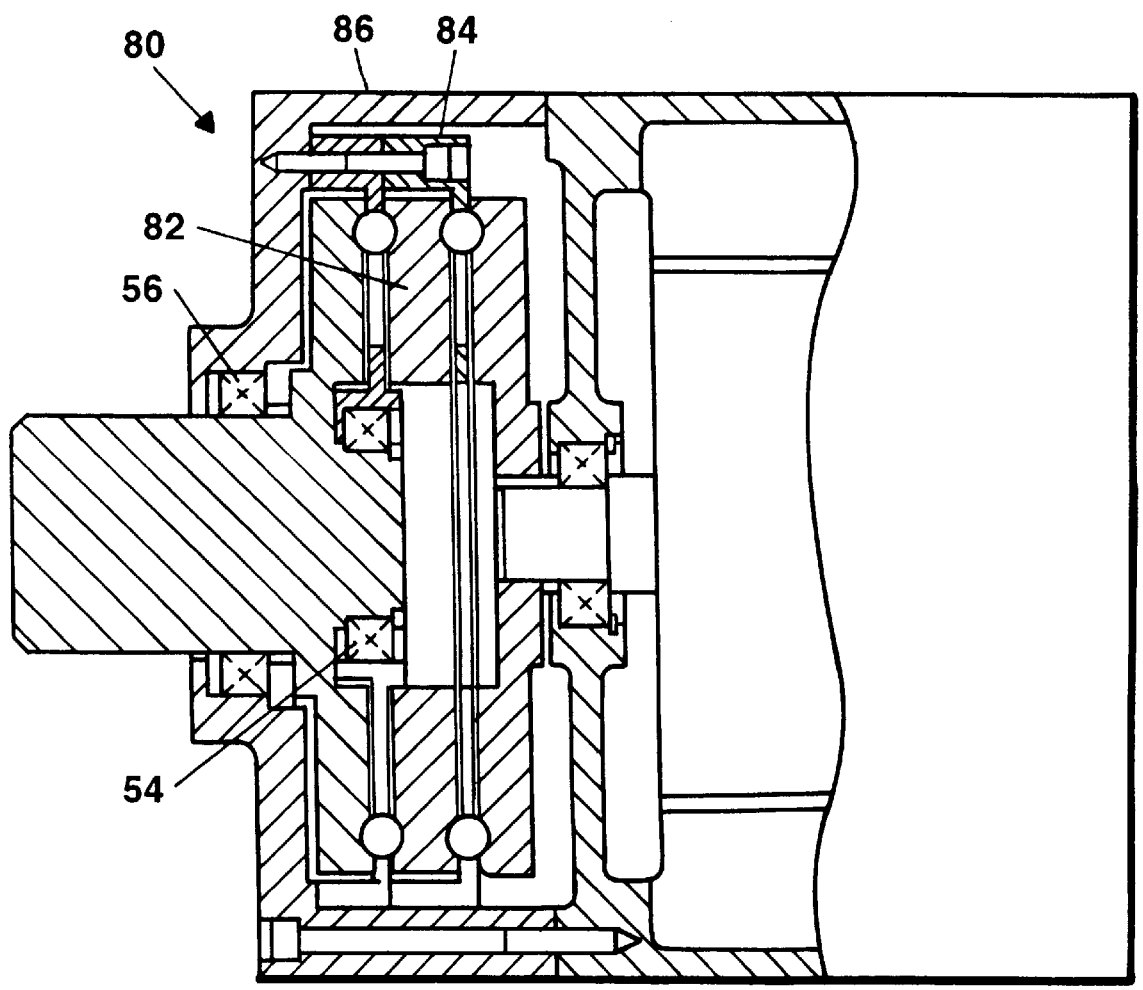
FIG. 3 is a side cross-sectional view of a two-stage embodiment of the prior art of FIG. 1.

A two-stage version 80 of the prior art is shown in FIG. 3, having the same components as in FIG. 1 except for an additional interim cam 82, interim reaction disk 84 and extended housing 86. This assembly will produce higher speed reductions, such as where an x:1 first stage is coupled with a y:1 second stage.

However, in the event of seizing up of the drive motor, the momentum of the load continues to turn the driven disk 26 and this can damage the drive because the input disk 20 is now effectively grounded via the seized motor. In U.S. Pat. No. 5,562,564 this is alleviated by ungrounding the reaction disk so that it can free-wheel to prevent damage. (This freewheeling should be distinguished from the disclosed power transmission from input to output using a floating ground of the present invention.) In this prior art, the first of the conjugate pair of cam devices is coupled to an input of the translation arrangement and the second of the cam devices is coupled to an output of the translation arrangement, such that motion of the first of the devices can be translated to motion of the second of the devices by the translation arrangement. The translation arrangement includes a reaction disk axially and rotationally fixed and having at least one radially extending slot for interaction with a rolling element. Alternatively the arrangement may include a cylindrical retainer ally and rotationally fixed and having at least one axially extending slot for interaction with a rolling element cooperating with cylindrical drive and driven members.

Figure 4:
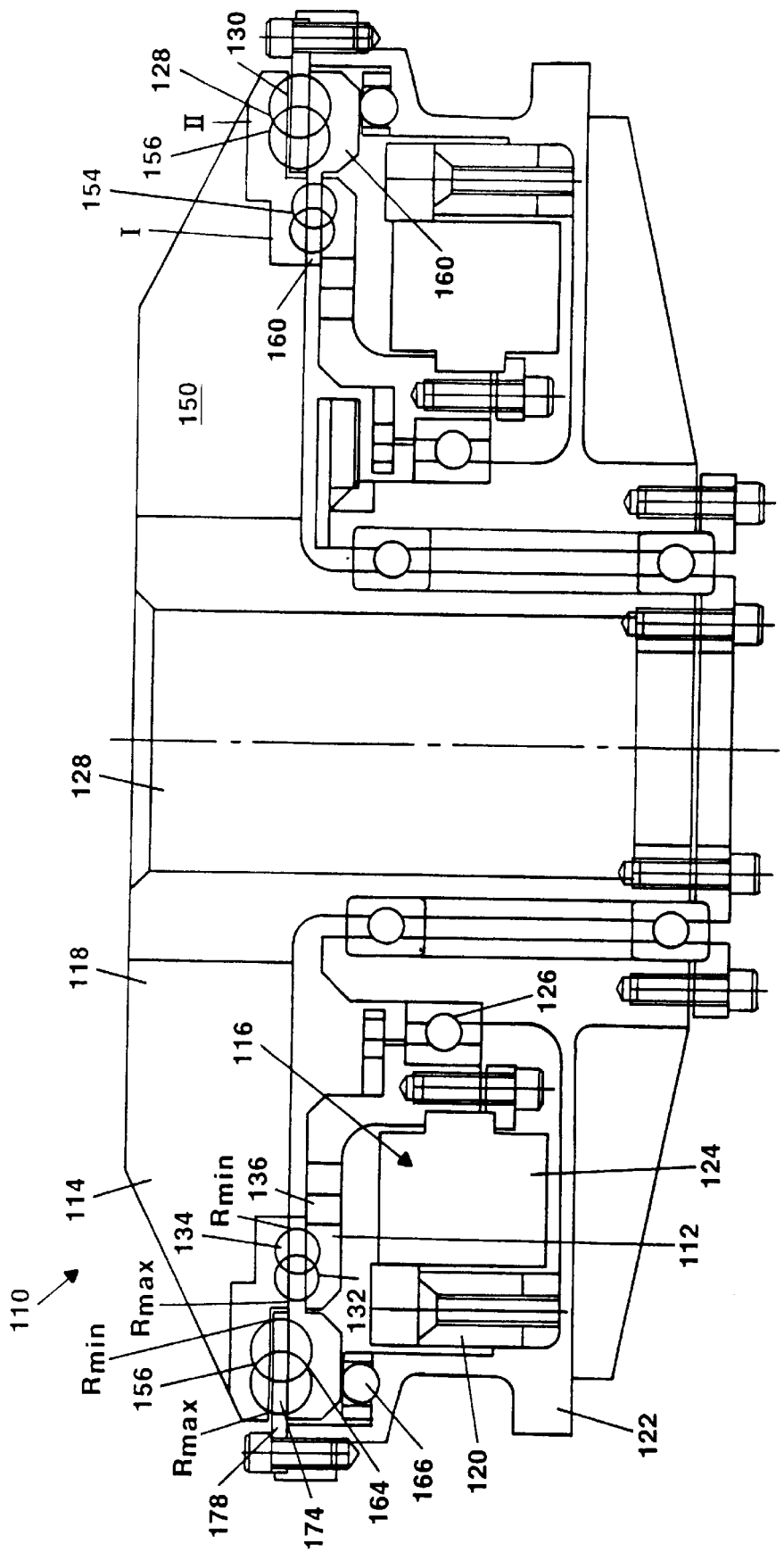
FIG. 4 is a side cross-sectional view of a two-stage embodiment of the present invention.

In practice of the present invention, a preferred motorized two-stage speed converter apparatus 110 is shown in FIG. 4, and further detailed in FIGS. 5–10, in which input 112 of the two-stage speed converter assembly 114 is driven by integral frameless motor 116. The speed converter translates the rotary force of the motor to a desired rotary force at the speed converter apparatus output 118 according to the speed conversion ratio of the two-stage speed converter assembly 114. The motor stator 120 is hard mounted on housing 122. Motor rotor 124, mounted via bearing 126 on housing 122, drives input disk 112 of the first stage of speed converter assembly 114. The entire apparatus 10 has an open center 128 for passage of cables and the like up within its middle.

Figure 5B:
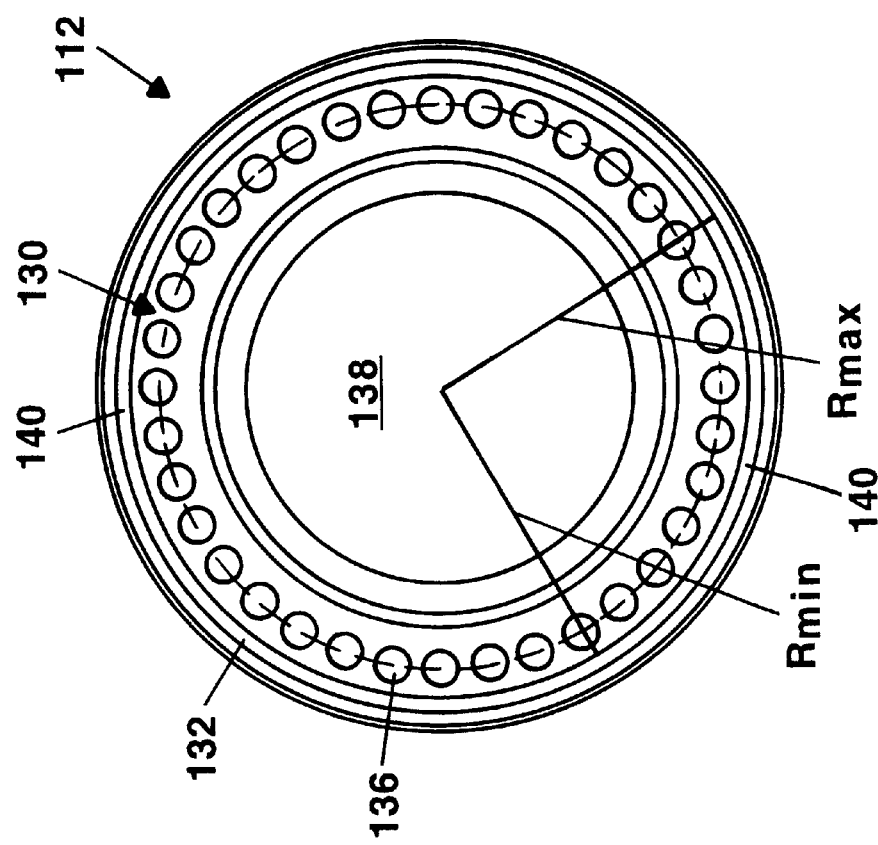
FIG. 5B is a face view of the input part of the first stage of the embodiment of FIG. 4.
Figure 5A:
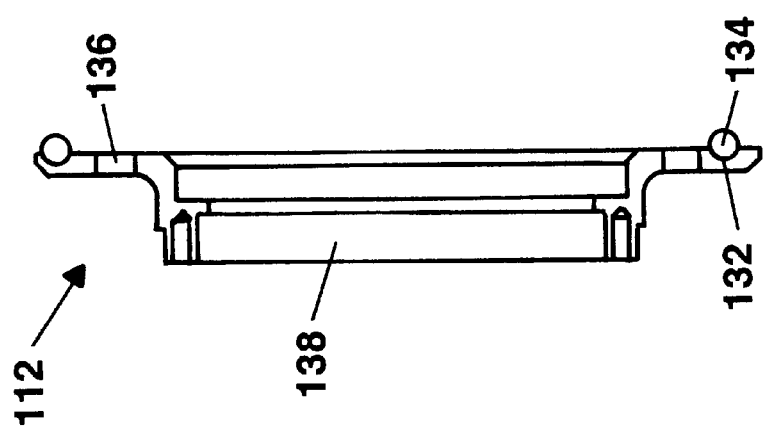
FIG. 5A is a side cross-sectional view of the input part of the first stage of the embodiment of FIG. 4
Figure 6B:
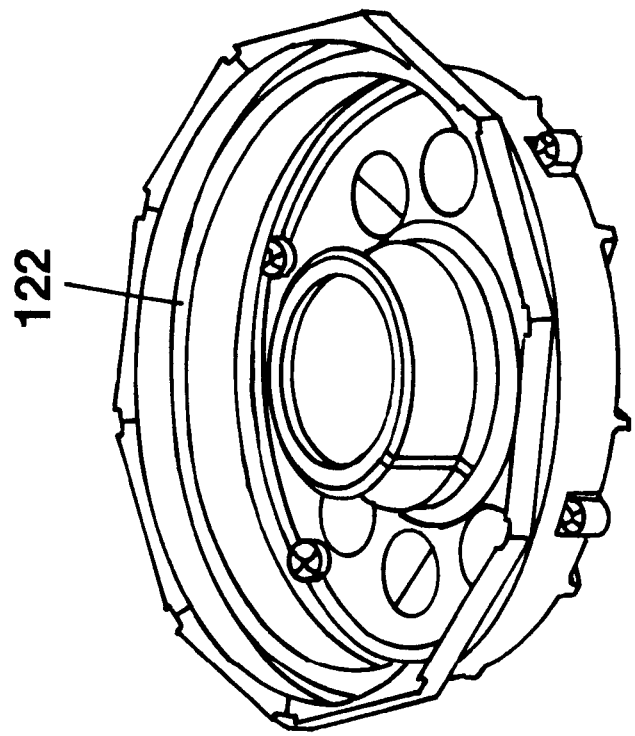
FIG. 6A–B are top and bottom perspective views of the housing of the embodiment of FIG. 4.
Figure 6A:
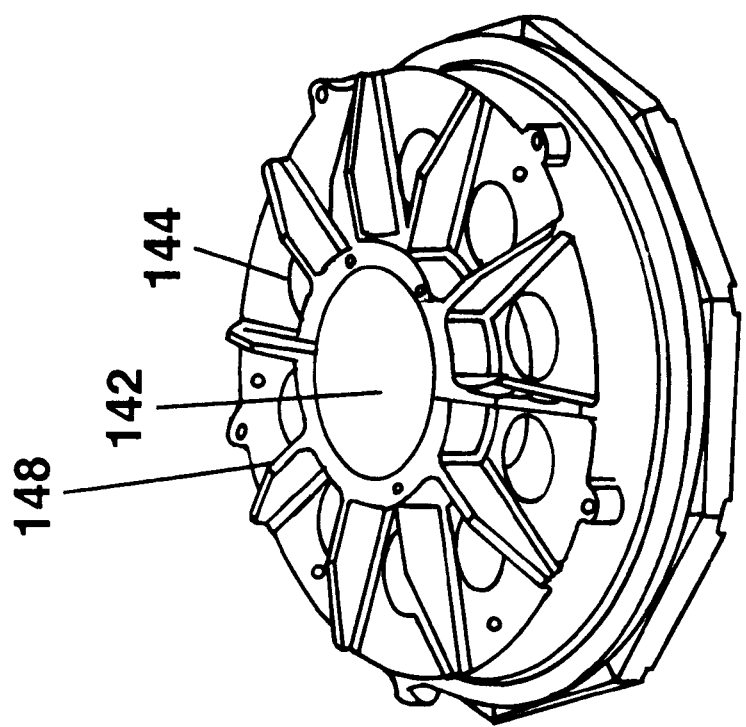

Input disk 112 is shown in detail in FIGS. 5A–B having a face 130 defining a first cam track 132 for receipt of a first complement of balls 134. The disk is further provided with lightening holes 136 and an open center 138. Track 132 has two lobes (or "teeth") 140, whose centerlines rise and fall between maximum radius Rmax and minimum radius Rmin. Housing 122 is shown in FIG. 6 having open center 142, lightening holes 144 and support fins 148.

Figure 7A:
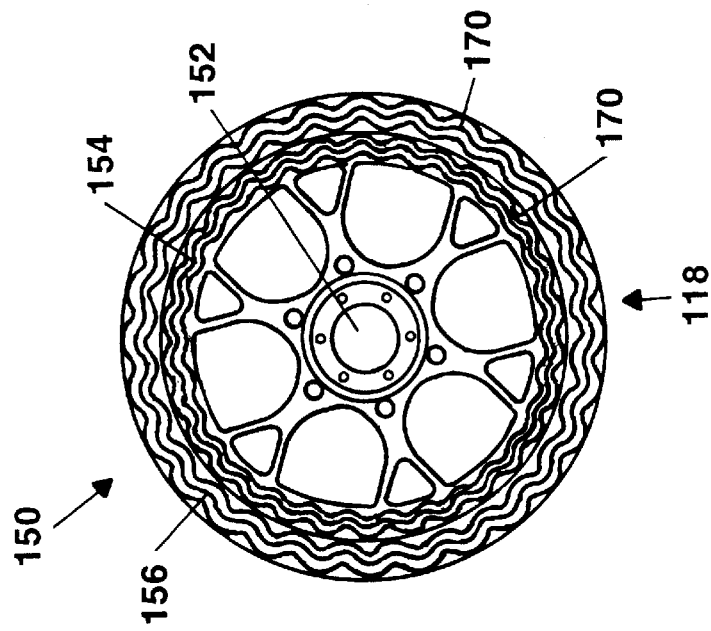
FIG. 7A in front view, FIG. 7B in side cross-section, and FIG. 7C in rear view, show the output part of the embodiment of FIG. 4.
Figure 7B:
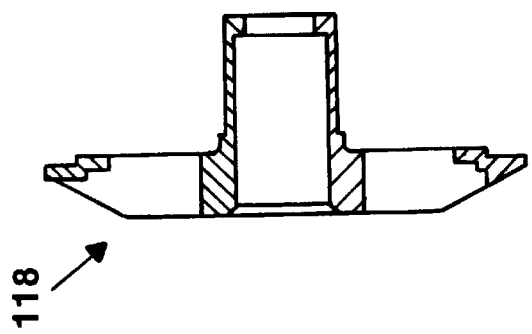
Figure 7C:
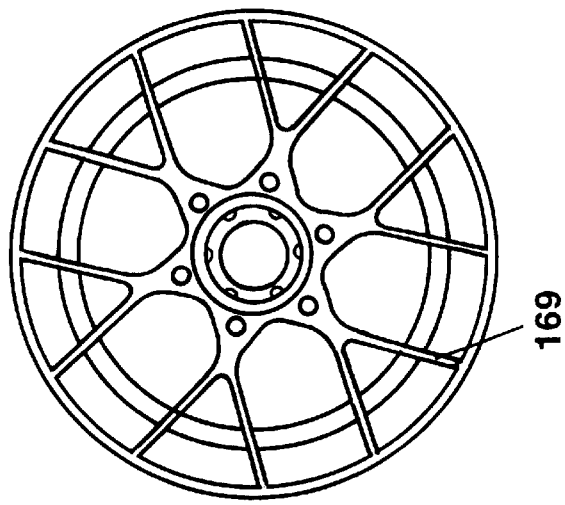
Figure 8:
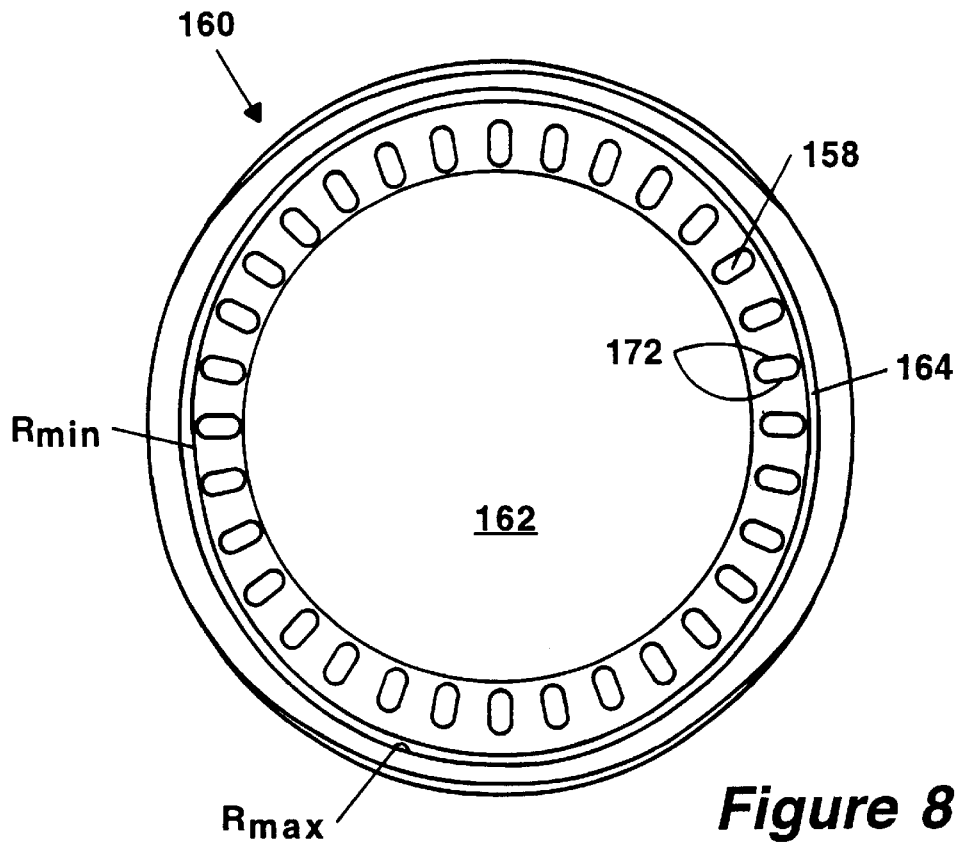
FIG. 8 is a front view of the floating ground element of the embodiment of FIG. 4.
Figure 9:
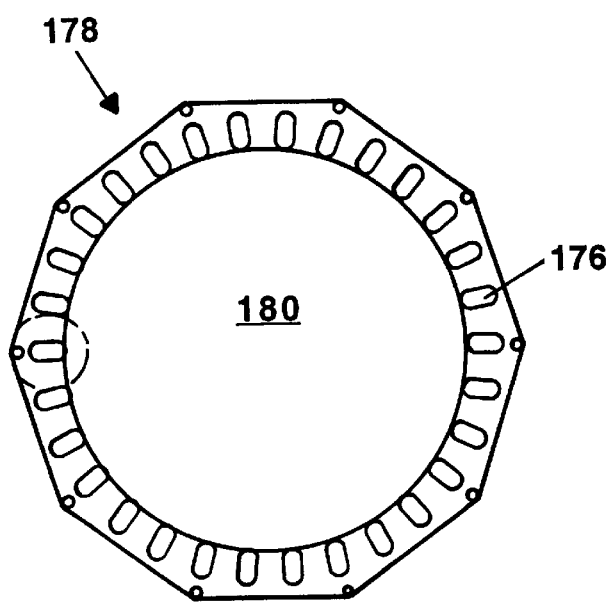
FIG. 9 is a front view of the fixed ground element of the embodiment of FIG. 4.
Figure 10A:
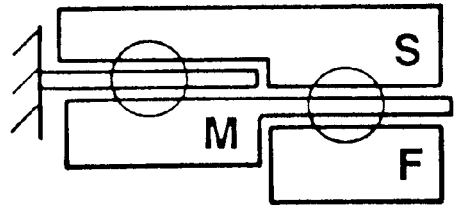
FIG. 10A–D show alternative configurations of the invention in partial side schematic.
Figure 10B:
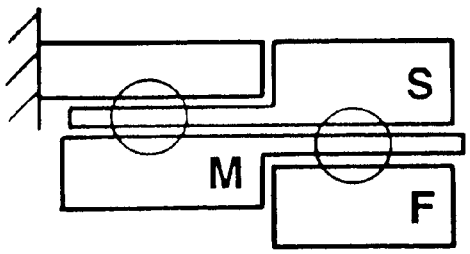
Figure 10C:
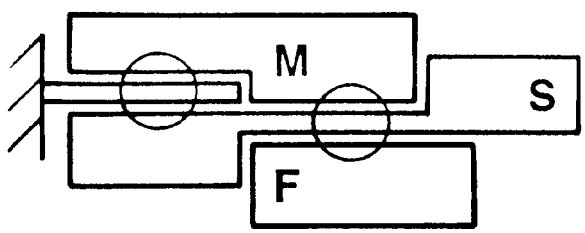
Figure 10D:
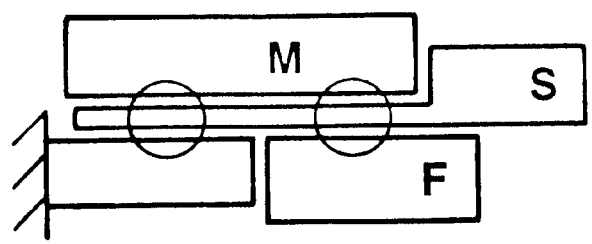

Referring to FIGS. 4, 7 and 8, speed converter output part 118 (to which a load is attached) includes a disk portion 150 with open center 152. A face of disk 150 defines an inner track 154 and an adjacent outer track 156. As input disk 112 is rotated by rotor 124, balls 134 are driven between their associated Rmin and Rmax in track 132 of the input part and at the same time they traverse slots 158 of floating slotted intermediate member 160, the latter having an open center 162 and defining an outer track 164 whose centerline rises and falls between its associated Rmin and Rmax to define a two tooth cam track. The floating member 160 is supported by thrust bearings 166. Disk 150 also has structural member fins 169.

There are two outputs driven by balls 134 for this first stage I. These balls drive against respective flanks 170 of driven track 154 on disk 150 and thus drive the output part 118 (integral with disk 150) into rotation while these balls are also driving against respective flanks 172 of the slots 158 of the intermediate slotted disk 160 and thus driving the floating-ground slotted disk 160 into rotation. Now the two-tooth cam track 164 that encircles slots 158 on the rotating slotted disk 160 acts as the input to the second stage. As the driving input, track 164 drives balls 174 into radial motion between their associated Rmin and Rmax in slots 176 of grounded slotted member 178. Slotted member 178 is fixed to the housing 122 and also has an open center 180. The driving forces on balls 174 are reacted by this fixed member 178, while balls 174 drive the outer driven track 156 of output part 150 into rotation. The rotary outputs on track 154 of stage I and on track 156 of stage II are summed as a single combined output of output part 150.

In the two-stage prior art of U.S. Pat. Nos. 5,312,306 and 5,562,564 two independent stages are used, each designed individually and each with its own set of three components serving as input, output and ground, except that the output of the first stage constitutes the input of the second stage. The total number of components in such an two-stage arrangement is five. The present invention yet reduces parts count further in a very compact and light-weight robust mechanism by defining a spatial arrangement of the components that permits the use of a single member as the floating-ground for both stages, thereby reducing the number of key components to four from the conventional two-stage prior art of five. The above floating intermediate member 160 of the invention serves this function, where its slotted part 158 provides a moving ground to the first stage while it also acts as one of two outputs of the first stage, while its two-tooth track 164 also acts as the input to the second stage. The first and second stages both drive the output part 118 in the same direction and at the same time. Thus the torques from each stage are combined.

Further variations of the invention follow, where each stage uses a cam or the slotted member as its output. Since there are two stages, this results in four possible configurations. It should be noted that each of the configurations below may also be used as a speed increaser by switching the input and output. Thus, without loss of generality, the components are defined as F as the fast gear (e.g., a speed reducer input or a speed increaser output), M as the medium-speed gear ("idler") and S is the slow gear (speed reducer output or speed increaser input). Ground is indicated with the usual symbol.

Stage I is shown on the inside (i.e. closer to the centerline) and Stage II is shown on the outside. The basic observation is that the output is moving a lot more slowly than the input or the idler, and so can be made to act in the nature of a relative ground as far as Stage I is concerned. As a result we eliminate a component by assigning this dual function to the idler 160.

The preferred configurations described herein are non-differential drives, having moving or floating ground, and where the output receives positive power from both Stages. This results in especially advantageous drives because some of the power in Stage I flows directly to the output, bypassing whatever inefficiency may exist in Stage II.

A major challenge in such novel designs is the avoidance of a differential-type power flow graph for the combined two-stage drive. Differential designs can yield very high speed ratios, but at very low efficiencies due to the existence of a closed loop in the power flow graph. Power flows indicate which elements in a drive are doing work on which other elements. Typically power flows in a single direction through the system from the input towards the output, with a fraction being lost to inefficiency at each step. In some adverse cases such as differentials, however, there is a power loop where two elements are simultaneously doing work on one another. These loops are very inefficient and waste a lot of power. They should, therefore, be avoided. Alternative configurations of the present invention are therefore possible using differential drives, but will suffer a reduced torque output.

FIG. 10 (A–D) depicts four possible configurations in schematic form. Each stage can be designated as forward or reverse, depending on whether the number of slots (and therefore of interacting elements) equals the difference or sum, respectively, of the number of teeth (or lobes) on the two cams. By analyzing the power flows in the system and avoiding a loop in the power flow graph, it is determined that designs A and C require Stage II to be reverse, while designs B and D require Stage II to be forward. Stage I can be forward or reverse in any of the designs.

The nominal speed ratios $\sigma_1$ and $\sigma_2$, respectively, of Stages I and II are calculated as the ratio of the numbers of teeth (or lobes) on the two cams forming part of that stage. Note that, for a speed reducer, the property $\sigma_i \geq 1$, i=1,2, holds. Accordingly, the speed ratios (input speed over output speed) for the four configurations are calculated as follows, where the upper sign applies if Stage I is forward and the lower sign applies if Stage I is reverse:

| Configuration | Speed ratio |
| --- | --- |
| A | $\pm \sigma_1\sigma_2 \pm \sigma_1 - \sigma_2$ |
| B | $\pm \sigma_1\sigma_2 - \sigma_2 + 1$ |
| C | $\mp \sigma_1\sigma_2 \mp \sigma_1 + 1$ |
| D | $\mp \sigma_1\sigma_2 + 1$ |

In the embodiment of FIG. 4, two reversing speed reducers are used. The first stage is a 15:1 (30:2) reversing drive and the second stage is a 14:1 (28:2) reversing drive. If the first stage input is clockwise, the first stage output tends to rotate the output 118 counterclockwise, while its slotted member applies a clockwise input to the second stage, which again rotates the output 118 counterclockwise. The speed reduction of the entire assembly of FIG. 4 is minus 239:1 as configuration A, the minus sign indicating the output rotation is in a direction opposite of the input rotation.

Figure 11:
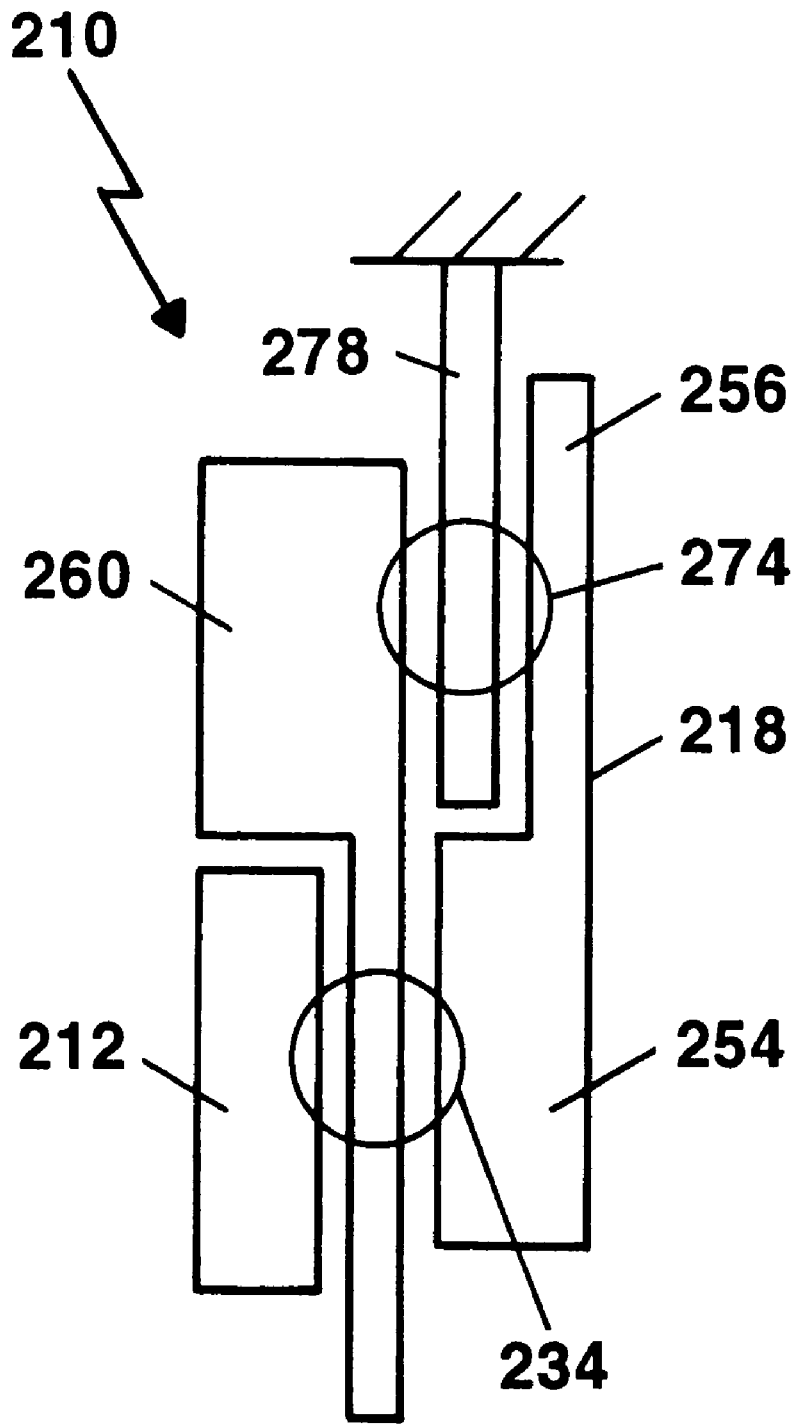
FIG. 11 is a schematic view of a cylindrical embodiment of the present invention.

Analogous to the above disclosed embodiments, FIG. 11 shows a cylindrical two-stage embodiment 210 of the present invention, having an input part 212 driving balls 234 of the first stage and resulting in rotary motion of both the floating intermediate member 260 and the first stage output part 254 which drives the apparatus output part 218 into rotation. Floating member 260 also provides the input drive to the second stage, driving balls 274 in the slots of the fixed reaction part 278 and these balls driving the second stage output part 256 which also drives the apparatus output part 218 into rotation. The resulting configuration offers the opportunity of a reduced parts-count high-speed conversion ratio cylindrical device.

It will be understood that the above description pertains to only several embodiments of the present invention. Furthermore, by holding tolerances tight, the present invention also provides a very low backlash speed converter, and one which is not backdriveable in a preferred embodiment. Therefore, a precision positioning transmission can be had in practice of the invention which can accurately drive a load to a desired position and then can hold the load with power off. Thus offering a compact and light weight yet accurate and robust embodiment of the invention.

The above description is provided by way of illustration and not by way of limitation. For example, there are many variations of the cam combinations that are possible in practice of the present invention. As well, in various of the foregoing embodiments, additional cam cycles and balls/slots may be employed. The invention is further characterized according to the following claims.

What is claimed is:

1. Apparatus for converting rotary input to a different output, the apparatus comprising
   a plurality of speed conversion stages including a first stage and a second stage, said first stage comprising a conjugate pair of devices and an intermediate device, ones of said devices being rotatable about a common axis, one of said devices being an input member, one of said devices being a floating ground member, and one of said devices being an output member, said floating ground member being an input to said second stage, and
   said first and second stages combining their outputs to achieve said different output.

2. Apparatus of claim 1 wherein said apparatus has a final speed ratio (SR) based on the nominal speed ratios $\sigma_1$ and $\sigma_2$, respectively, of said first and second stages, said final speed ratio calculated according to any of the following relationships, where the upper sign applies if said first stage is forward rotating and the lower sign applies if said first stage is reverse rotating:

| Configuration | SR = |
| --- | --- |
| A | $\pm \sigma_1\sigma_2 \pm \sigma_1 - \sigma_2$ |
| B | $\pm \sigma_1\sigma_2 - \sigma_2 + 1$ |
| C | $\mp \sigma_1\sigma_2 \mp \sigma_1 + 1$ |
| D | $\mp \sigma_1\sigma_2 + 1$ | wherein said input member is a relatively high speed input member, said output member is a lower speed output member, and said floating ground member couples said first stage to said second stage.

3. Apparatus of claim 1 wherein said intermediate member is a slotted part and said slots are radially elongated through holes.

4. Apparatus of claim 1 wherein said conjugate pair of devices comprise a pair of cam surfaces.

5. Apparatus of claim 4 wherein said intermediate devices comprises a slotted part, wherein said slotted part comprises a plurality of slots and said conjugate pair of devices interact via interacting elements in said slots.

6. Apparatus of claim 5 wherein said devices are disks and said cam surfaces are tracks.

7. The apparatus of claim 1 wherein a first device of said pair of devices comprises a drive cam and second device of said pair of devices comprises a driven cam.

8. Apparatus of claim 1 further comprising a housing, second stage drive device for rotary driving, said second stage having a drive cam and further having second stage driven part for being rotary driven, further comprising a second cam, and a conversion device located between said cam devices of said second stage.

9. Apparatus of claim 8 further including a reaction frame fixed to the housing and having a fixed length slot, constant angular velocity reciprocating translation device for translation of rotation of the drive cam to rotation of the driven cam, the translation device, while reciprocating in the slot, interacting the two cams, wherein the speed of said first stage input member does not equal the speed of the second stage output member.

10. Apparatus of claim 9 wherein the translation device further comprises a plurality of reaction elements, with a respective one of the elements associated with a respective one of the slots.

11. Apparatus of claim 5 wherein the elements are balls.

12. Apparatus of claim 5 further comprising a plurality of reaction elements, with a respective one of the elements associated with a respective one of the slots.

13. Multi-stage speed conversion apparatus comprising
   a first stage with a pair of conjugate devices and an intermediate device, all of said devices being rotatable about a common axis, one of said devices being an input member, one of said devices being a floating ground member, and one of said devices being an output member, said floating ground member being an input to a second stage, and said first and second stages combining their outputs to achieve rotary output, and
   said second stage including a housing, a drive device for rotary driving and a driven device for being rotary driven, and a conversion device including a reaction frame fixed to the housing further comprising a fixed length slot and a constant angular velocity reciprocating translation device for translation of rotation of said drive device into rotation of said driven device said translation device, while reciprocating in the slot, interacting said drive and driven devices for generating said rotary output.

14. Apparatus of claim 13 wherein said apparatus has a final speed ratio (SR) based on the nominal speed ratios $\sigma_1$ and $\sigma_2$, respectively, of said first and second stages, said final speed ratio calculated according to any of the following relationships, where the upper sign applies if said first stage is forward rotating and the lower sign applies if said first stage is reverse rotating:

| Configuration | SR = |
| --- | --- |
| A | $\pm \sigma_1\sigma_2 \pm \sigma_1 - \sigma_2$ |
| B | $\pm \sigma_1\sigma_2 - \sigma_2 + 1$ |
| C | $\mp \sigma_1\sigma_2 \mp \sigma_1 + 1$ |
| D | $\mp \sigma_1\sigma_2 + 1$ | wherein said input member is a relatively high speed input member, said output member is a lower speed output member, and said floating ground member couples said first stage to said second stage.

15. A method for translating the speed of a drive shaft which is driven at a first speed to the speed of a driven shaft at a second speed in two-stages, the method comprising the steps of:

forming two speed conversion stages, providing device for driving having a fast gear in the first stage, providing device for being driven including a slow gear in the first stage, providing a medium-speed gear floating ground member in the first stage, proving a second stage with an input and an output and a grounded reaction member, and applying an input rotation to the first stage and deriving two outputs of the first stage, one output driving the second stage input, and summing the first stage other output and the second stage output to drive said driven shaft at said second speed.

16. The method of claim 15 further providing the first stage with a member having a slot, including providing at least one reciprocating transfer element located in the slot for reciprocating motion, such that said driven shaft is driven at said second speed.

* * * * *